(12) United States Patent
Gorantla Narayana Murthy

(10) Patent No.: US 11,850,958 B2
(45) Date of Patent: Dec. 26, 2023

(54) CONNECTOR UNIT FOR A PLUG-IN ELECTRICAL VEHICLE

(71) Applicant: Ningbo Geely Automobile Research & Development Co., Ltd., Ningbo (CN)

(72) Inventor: Sri Vishnu Gorantla Narayana Murthy, Gothenburg (SE)

(73) Assignee: NINGBO GEELY AUTOMOBILE RESEARCH & DEVELOPMENT CO, Ningbo (CN)

(*) Notice: Subject to any disclaimer, the term of this patent is extended or adjusted under 35 U.S.C. 154(b) by 533 days.

(21) Appl. No.: 17/150,586

(22) Filed: Jan. 15, 2021

(65) Prior Publication Data

US 2021/0129691 A1 May 6, 2021

Related U.S. Application Data

(63) Continuation of application No. PCT/CN2019/099805, filed on Aug. 8, 2019.

(30) Foreign Application Priority Data

Aug. 14, 2018 (EP) .................................... 18188879

(51) Int. Cl.
 *B60L 53/16* (2019.01)
 *H01R 13/70* (2006.01)
 (Continued)

(52) U.S. Cl.
 CPC ............ *B60L 53/16* (2019.02); *H01R 13/447* (2013.01); *H01R 13/7036* (2013.01);
 (Continued)

(58) Field of Classification Search
 CPC ........ B60L 53/16; B60L 2270/36; B60L 3/00; H01R 13/447; H01R 13/7036;
 (Continued)

(56) References Cited

U.S. PATENT DOCUMENTS

2011/0300753 A1* 12/2011 Ichikawa ................ B60L 53/16
 439/620.21
2013/0127413 A1 5/2013 Ohtomo
2015/0303715 A1 10/2015 Finkenzeller

FOREIGN PATENT DOCUMENTS

CN 102245423 A 11/2011
CN 104044481 A 9/2014
 (Continued)

OTHER PUBLICATIONS

International Search Report from corresponding International Application No. PCT/CN2019/099805, dated Oct. 30, 2019, 2 pages.
 (Continued)

*Primary Examiner* — Nghia M Doan
(74) *Attorney, Agent, or Firm* — TUCKER ELLIS LLP

(57) ABSTRACT

A connector unit for a plug-in electrical vehicle includes a first set of terminals for connection with a high-voltage energy storage, a second set of terminals for connection with an electrical propulsion motor, a connector interface having electrical connectors and being configured for temporarily receiving a corresponding connector interface of a charging connector during charging of the high-voltage energy storage of the plug-in electrical vehicle, and a permanent or temporary electrical connection between the first set of terminals and the second set of terminals.

17 Claims, 8 Drawing Sheets

(51) Int. Cl.
*H01R 13/447* (2006.01)
*H01R 13/703* (2006.01)
*H01R 43/26* (2006.01)
*H02J 7/00* (2006.01)

(52) U.S. Cl.
CPC ............ *H01R 43/26* (2013.01); *H02J 7/0045* (2013.01); *H01R 2201/26* (2013.01)

(58) Field of Classification Search
CPC .... H01R 43/26; H01R 2201/26; H01R 13/70; H02J 7/0045; H01H 3/022
See application file for complete search history.

(56) References Cited

FOREIGN PATENT DOCUMENTS

| | | | |
|---|---|---|---|
| CN | 207117230 U | 3/2018 | |
| DE | 4403551 A1 | 8/1995 | |
| DE | 19822242 A1 | 11/1999 | |
| EP | 0863522 A2 | 9/1998 | |
| EP | 2883739 A1 * | 6/2015 | .............. B60L 15/20 |
| JP | 2008211943 A | 11/2008 | |
| JP | 2011139595 A * | 7/2011 | |
| WO | 2010119097 A2 | 4/2010 | |

OTHER PUBLICATIONS

International Preliminary Report on Patentability from corresponding International Application No. PCT/CN2019/099805, dated Dec. 1, 2020, 21 pages.

* cited by examiner

CONNECTOR UNIT FOR A PLUG-IN ELECTRICAL VEHICLE

RELATED APPLICATION DATA

This application is a continuation of International Patent Application No. PCT/CN2019/099805, filed Aug. 8, 2019, which claims the benefit of European Patent Application No. 18188879.3, filed Aug. 14, 2018, the disclosures of which are incorporated herein by reference in their entireties.

TECHNICAL FIELD

The disclosure relates to a connector unit for a plug-in electrical vehicle. The disclosure also relates to an electrical system for a plug-in electrical vehicle, as well as a method for charging a high-voltage energy storage of a plug-in electrical vehicle.

The connector unit, electrical system and method for charging may be implemented in various types of plug-in electrical vehicles, such as for example cars, trucks, buses, marine vessels, work vehicles such as wheel loaders, excavators, dumpers, compacting machines or forest machines, off-road vehicles, or the like.

BACKGROUND

Plug-in electrical vehicles typically comprises an electrical motor and a high-voltage electrical energy storage, such as a high-voltage electrical battery and/or a capacitor. Plug-in electrical vehicles typically also comprises a connector unit configured for temporarily receiving a charging connector during charging of the high-voltage energy storage during vehicle parking. Thereby, plug-in electrical vehicles enable pure electrical propulsion for a certain operating range after full charging of the high-voltage electrical energy storage.

Plug-in electrical vehicles may be pure electrical vehicles having only the high-voltage electrical energy storage as energy source, or they may be hybrid-electric vehicles having both a high-voltage electrical energy storage and an additional energy source, such as for example an internal combustion engine or a fuel-cell.

In the field of plug-in electrical vehicles, there is a continuous demand for reduced manufacturing cost and improved reliability.

However, despite the activities in the field, there is still a demand for an improved plug-in electrical vehicle, which is capable of meeting the requirements as to manufacturing cost and reliability.

SUMMARY

This section provides a general summary of the disclosure, and is not a comprehensive disclosure of its full scope or all of its features.

A general object of the present disclosure is to provide a connector unit for a plug-in electrical vehicle, which enables manufacturing of the plug-in electrical vehicle with reduced manufacturing cost and improved reliability. A further object of the present disclosure is to provide an electrical system for a plug-in electrical vehicle, as well as a method for charging a high-voltage energy storage of a plug-in electrical vehicle, which system and method also enables manufacturing of the plug-in electrical vehicle with reduced manufacturing cost and improved reliability.

This and other objects, which will become apparent in the following, are accomplished by a connector unit as defined in the accompanying independent claims.

According to a first aspect of the present disclosure, there is provided a connector unit for a plug-in electrical vehicle, wherein the connector unit comprises a first set of terminals for connection with a high-voltage energy storage, a second set of terminals for connection with an electrical propulsion motor, a connector interface having electrical connectors and being configured for temporarily receiving a corresponding connector interface of a charging connector during charging of the high-voltage energy storage of the plug-in electrical vehicle, and a permanent or temporary electrical connection between the first set of terminals and the second set of terminals.

According to a second aspect of the present disclosure, there is provided an electrical system for a plug-in electrical vehicle, wherein the electrical system comprises: a high-voltage energy storage having a single external electrical connection, an electrical propulsion motor, and a connector unit including a first set of terminals, a second set of terminals and a connector interface. The first set of terminals are connected with the single external electrical connection of the high-voltage energy storage. The second set of terminals are connected with the electrical propulsion motor. The connector unit is configured to provide permanent or temporary electrical connection between the first set of terminals and the second set of terminals, and the connector interface has electrical connectors being configured for temporarily receiving a corresponding connector interface of a charging connector during charging of the high-voltage energy storage.

According to a third aspect of the present disclosure, there is provided a method for charging a high-voltage energy storage of a plug-in electrical vehicle, wherein the method comprises: adjusting a switching mechanism for setting a connector unit in a charging mode, in which a first set of terminals is temporarily disconnected from a second set of terminals, wherein the first set of terminals are connected with a high-voltage energy storage and wherein the second set of terminals are connected with an electrical propulsion motor of the plug-in electrical vehicle; connecting a charging connector of an external stationary charger to a connector interface of the connector unit; supplying a charging current from the charging connector to the high-voltage energy storage via the connector unit; disconnecting the charging connector from the connector interface of the connector unit; and adjusting the switching mechanism for setting the connector unit in a driving mode, in which the first set of terminals is temporarily connected with the second set of terminals.

In this way, since electric current flowing between the high-voltage energy storage and the electrical propulsion motor in a driving mode will pass through the connector unit, and since electric current flowing between an external stationary charger and the high-voltage energy storage in a charging mode will also pass through the connector unit, the high-voltage energy storage only need to have a single high-voltage electrical connection, namely one high-voltage electrical connection between the high-voltage energy storage and the connector unit.

Compared with conventional circuit solutions for plug-in electrical vehicles, which typically comprises a high-voltage energy storage with two high-voltage electrical connections, namely a first high-voltage electrical connection for connecting the high-voltage energy storage with the electrical propulsion motor and a second high-voltage electrical connection for connecting the high-voltage energy storage with an external stationary charger, the connector unit according to the disclosure enables reduced number of high-voltage electrical connections of the high-voltage energy storage.

Reduced number of high-voltage electrical connections of the high-voltage energy storage result in less components required for manufacturing the high-voltage energy storage, as well as less complex overall design of the high-voltage energy storage. Less components generally results in less cost and less likelihood of some component malfunctioning, and less complex design generally results in more cost-efficient manufacturing. Consequently, the connector unit, the electrical system and the method for charging the high-voltage energy storage according to the disclosure enables manufacturing of the plug-in electrical vehicle with reduced manufacturing cost and improved reliability.

Further advantages are achieved by implementing one or several of the features of the dependent claims.

In one example embodiment, the connector unit further comprises a switching mechanism for selectively setting the connector unit in a driving mode or a charging mode, wherein the first set of terminals is temporarily connected with the second set of terminals in the driving mode, such that a closed circuit between the high-voltage energy storage and the electrical propulsion motor can be established, and wherein the first set of terminals is temporarily disconnected from the second set of terminals in the charging mode, such that a charging voltage supplied from the charging connector to the electrical connectors of the connector interface and further to the first set of terminals is not supplied to the electrical propulsion motor or associated electrical converter. Thereby, charging current is efficiently routed to the high-voltage energy storage during charging of the vehicle by means of the charging connector and the electrical motor and any associated electrical converter are unexposed to the charging current, thereby reducing the risk for damages to thereto. Moreover, the switching mechanism enables the electrical connectors of the connector unit to be switched to non-accessible state in the driving mode, such that user safety may be improved.

In a further example embodiment, the electrical connectors of the connector interface are connected with the first set of terminals in the charging mode and disconnected with the first set of terminals in the driving mode. Thereby, the risk that a user accidentally receives an electrical shock by coming into contact with electrical connectors of the connector unit in the driving mode is reduced.

In one example embodiment, the electrical connectors of the connector interface are accessible for being connected to the corresponding connector interface of a charging connector in the charging mode, and the electrical connectors of the connector interface are non-accessible for the corresponding connector interface of a charging connector in the driving mode. Thereby, the risk that a user accidentally receives an electrical shock by coming into contact with electrical connectors of the connector unit in the driving mode is reduced.

In one example embodiment, the electrical connectors of the connector interface are configured for being folded down to be non-accessible for the corresponding connector interface of a charging connector in the driving mode. Thereby, high level of safety against a user unintentionally coming in contact with the electrical connectors is accomplished.

In still a further example embodiment, the electrical connectors of the connector interface are accessible for being connected to the corresponding connector interface of a charging connector in both the driving mode and charging mode. This arrangement enables a robust, reliable and cost-efficient design of the connector unit, and other electrical devices may be used for providing desired disconnection between the connector unit and propulsion motor in the charging mode.

In yet a further example embodiment, the connector unit comprises a first part and second part that are detachably mounted to each other, wherein the first part is configured for being permanently mounted on the vehicle and comprises the first and second set of terminals, wherein the second part comprises the connector interface with the electrical connectors, wherein the first part has a first set of intermediate electrical connectors that are connected with the first set of terminals and configured to establish an electrical connection with a first set of corresponding intermediate electrical connectors of the second part upon attachment of the first part with the second part, wherein the first part has a second set of intermediate electrical connectors that are connected with the second set of terminals and configured to establish an electrical connection with a second set of corresponding intermediate electrical connectors of the second part upon attachment of the first part with the second part, and wherein an adjustable or permanent connection between the first set of terminals and the second set of terminals, in an attached state of the first part with the second part, is located in the second part. The two-part connector unit enables improved anti-theft capacity and improved safety for service personnel or rescue personnel in case of an accident or fire or the like.

In yet a further example embodiment, the switching mechanism further is arranged for selectively setting the connector unit in a locking mode, in which the first set of terminals is disconnected with the second set of terminals, and in which the electrical connectors of the connector interface are non-accessible for the corresponding connector interface of a charging connector. The locking mode enables improved anti-theft capacity without necessitating the removal of a part of the connector unit.

In a further example embodiment, the switching mechanism is configured to be manually adjustable between the driving mode and the charging mode by a user of the vehicle. This allows efficient control of the setting of the connector unit to the user.

In a further example embodiment, the switching mechanism is configured to be manually adjusted to the charging mode before connecting the connector interface with the corresponding connector interface. Thereby proper switching of the switching mechanism may be performed, and optionally also verified by the user, before connecting the connector interface with the corresponding connector interface, such that correct and reliable connection may be provided.

In yet a further example embodiment, the switching mechanism is configured to be remotely adjustable between the driving mode and the charging mode by a user of the vehicle. This enables the user to control the setting of the connector unit via for example a control device in the cockpit of the vehicle, or via a mobile device.

In yet a further example embodiment, the first set of terminals is permanently connected with the second set of terminals, and the electrical connectors of the connector interface are permanently connected with the first set of terminals. This arrangement enables a robust, reliable and cost-efficient design of the connector unit, and other electrical devices may be used for providing desired disconnection between the connector unit and propulsion motor in the charging mode.

In still a further example embodiment, the first set of corresponding intermediate electrical connectors is permanently connected with the second set of corresponding intermediate electrical connectors, and the electrical connectors of the connector interface are permanently connected with the first set of corresponding intermediate electrical connectors. This arrangement enables a robust, reliable and cost-efficient design of the connector unit, and other electrical devices may be used for providing desired disconnection between the connector unit and propulsion motor in the charging mode.

In yet a further example embodiment, the electrical connectors of the connector interface are male connectors, female connectors, or mixed male and female connectors.

In yet a further example embodiment, the first and second set of intermediate electrical connectors are male connectors, female connectors, or mixed male and female connectors.

In some example embodiments, the switching mechanism includes foldable electrical connectors for selectively setting the connector unit in the driving mode or the charging mode, wherein in the charging mode the electrical connectors are configured for being pivotally adjusted to a charging position in which the electrical connectors protrude towards the charging connector for enabling supply of electrical energy from an external energy source to the high-voltage energy storage via the connector unit, and wherein in the driving mode the electrical connectors are configured for being pivotally adjusted to a driving position in which the electrical connectors provide electrical contact between the first and second set of terminals for enabling supply of electrical energy from the high-voltage energy storage to the traction motor via the connector unit. Thereby, dual functionality may be provided by the electrical connectors, while simultaneously ensuring that charging power may never be supplied to the traction motor or associated power converter.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which:

FIG. 12 shows an example embodiment of a flow chart for charging the high-voltage energy storage of a plug-in electrical vehicle, and.

DETAILED DESCRIPTION

Figure 1:
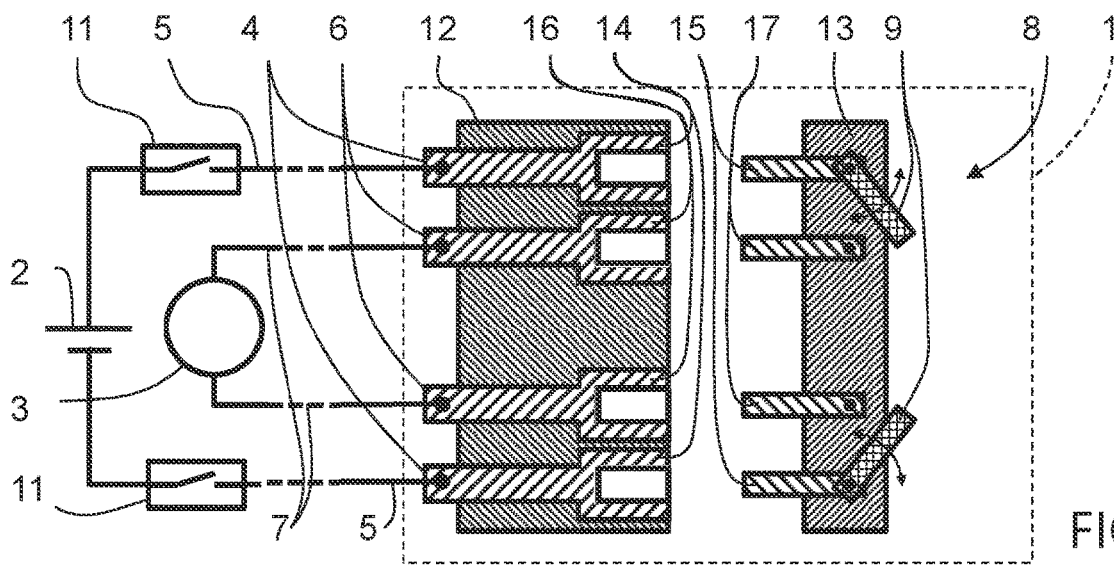
FIG. 1 shows a first example embodiment of a two-part connector unit.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Referring now to FIG. 1, there is depicted a cross-sectional view of a first example embodiment of the connector unit 1 according to the disclosure, as well as its connection with a high-voltage energy storage 2 and an electrical propulsion motor 3.

The connector unit 1 may have various exterior designs and may be made of various materials, such as in particular plastic material. FIG. 1 merely shows a very schematic illustration of the connector unit with focus on the functionality of the connector unit 1, and the connector unit may have various other designs and structure within the scope of the appended claims.

The connector unit 1 is suitable for being mounted in a plug-in electrical vehicle and the connector unit 1 comprises a first set of terminals 4 for connection with electrical cables or conductors 5 associated with the high-voltage energy storage 2 of the plug-in electrical vehicle. The connector unit 1 further comprises a second set of terminals 6 for connection with electrical cables or conductors 7 associated with an electrical propulsion motor 3 of the plug-in electrical vehicle.

The connector unit 1 further comprises a connector interface 8 having electrical connectors 9 and configured for temporarily receiving a corresponding connector interface of a charging connector during charging of the high-voltage energy storage of the plug-in electrical vehicle.

The connector unit 1 further comprises a permanent or temporary electrical connection between the first set of terminals 4 and the second set of terminals 6.

Thereby, the connector unit 1 may function as a single high-voltage electrical contact for the high-voltage energy storage 2, because electrical energy from the high-voltage energy storage 2 may be transferred to the electrical propulsion motor 3 via the permanent or temporary electrical connection between the first set of terminals 4 and the second set of terminals 6, and electrical charging current from an external charging unit may be conveyed from the external charging unit to the high-voltage energy storage 2 via the electrical connectors 9 of the connector interface 8 and the first set of terminals 4.

Conventional high-voltage energy storages for plug-in electrical vehicles generally include two high-voltage electrical contacts, one for connection with the electrical propulsion motor and one for connection with a charging connector. However, a high-voltage energy storage having a single high-voltage electrical contact enables reduced manufacturing cost and improved reliability of the plug-in electrical vehicle, because a single high-voltage electrical contact results in less components and simplified mounting of the high-voltage energy storage in the vehicle.

The first set of terminals 4 typically includes a first terminal for connection with a positive pole of the high-voltage energy storage 2 and a second terminal for connection with a negative pole of the high-voltage energy storage 2. Electrical cables or conductors 5 associated with the high-voltage energy storage 2 of the plug-in electrical vehicle are used for connecting the first set of terminals 4 with the positive and negative poles of the high-voltage energy storage 2.

The connection between the first set of terminals 4 and the poles of the high-voltage energy storage 2 may be direct, i.e. without any intermediate electrical components, or indirect, e.g. including one or more intermediate electrical components.

One example of intermediate electrical components positioned between the first set of terminals 4 and the poles of the high-voltage energy storage 2 is a mechanically or electrically operated switch 11 for enabling activation/deactivation of the electrical system of the vehicle, as shown in FIG. 1. Other types of intermediate electrical components may be safety fuses for rapid disconnection of the high-voltage energy storage 2 in case of short-circuit or the like, or a high-voltage energy storage 2 control unit for controlling charging and/or power output of the high-voltage energy storage 2.

The second set of terminals 6 for connection with electrical cables 7 associated with an electrical propulsion motor 3 of the plug-in electrical vehicle.

The second set of terminals 6 typically includes a first terminal and a second terminal. Electrical cables or conductors 7 associated with the electrical propulsion motor 3 of the plug-in electrical vehicle are used for connecting the second set of terminals 6 with the electrical propulsion motor 3.

The connection between the second set of terminals 6 and the electrical propulsion motor 3 may be direct, i.e. without any intermediate electrical components, or indirect, e.g. including one or more intermediate electrical components.

One example of intermediate electrical components positioned between the second set of terminals 6 and the electrical propulsion motor 3 may be an electrical converter for controlling the speed and torque of the electrical propulsion motor 3. Various types of electrical converters exists for controlling the electrical propulsion motor 3, which for example may be a DC or an AC electrical propulsion motor.

In the example embodiment of FIG. 1, the connector unit 1 comprises a first part 12 and second part 13 that are detachably mountable to each other. In FIG. 1 the first and second parts 12, 13 are shown in a detached state, i.e. separated from each other.

The first part 12 is configured for being permanently mounted on the vehicle and comprises the first and second set of terminals 4, 6 and the second part comprises the connector interface 8 with the electrical connectors 9. The first part 12 has a first set of intermediate electrical connectors 14 that are connected with the first set of terminals 4 and configured to establish an electrical connection with a first set of corresponding intermediate electrical connectors 15 of the second part 13 upon attachment of the first part 12 with the second part 13. Furthermore, the first part 12 has a second set of intermediate electrical connectors 16 that are connected with the second set of terminals 6 and configured to establish an electrical connection with a second set of corresponding intermediate electrical connectors 17 of the second part 13 upon attachment of the first part 12 with the second part 13. Finally, the adjustable or permanent electrical connection between the first set of terminals 4 and the second set of terminals 6, in an attached state of the first part 12 with the second part 13, is located in the second part 13.

The two-part configuration of the connector unit 1 having a first part 12 and second part 13 that are detachably mounted to each other enables improved protection against vehicle theft, because a user can then simply detach and bring along the second part 13 upon leaving the vehicle, thereby eliminating electrical contact between the first and second set of terminals 4, 6, i.e. between the high-voltage energy storage 2 and the electrical propulsion motor 3. Moreover, the two-part configuration of the connector unit 1 may also be beneficial for ensuring disconnection of the high-voltage energy storage 2 during service and repair work on the vehicle, as well as for enabling quick and easy disconnection of the high-voltage energy storage 2 for avoiding that first responders and tow operators are exposed to risk for potential electric shock from damaged systems in relation to a vehicle crash.

The first and second set of intermediate electrical connectors 14, 16 may for example be female connectors, as illustrated in FIG. 1. Alternatively, first and second set of intermediate electrical connectors 14, 16 may be male connectors, or mixed male and female connectors, or any other type of connectors.

Similarly, the first and second set of corresponding intermediate electrical connectors 15, 17 may equally be male connectors, as illustrated in FIG. 1, or mixed male and female connectors, or any other type of connectors. This applies all example embodiments of the disclosure.

In the example embodiment of FIG. 1, the electrical connectors 9 are illustrated as male connectors. However, the electrical connectors 9 mat alternative be female connectors, or mixed male and female connectors, or any other type of connectors. This applies all example embodiments of the disclosure.

The electrical connector unit 1 of the example embodiment of FIG. 1 further comprises a switching mechanism for selectively setting the connector unit 1 in a driving mode or a charging mode. In the driving mode, the first set of terminals 4 is temporarily connected with the second set of terminals 6, such that a closed circuit between the high-voltage energy storage 2 and the electrical propulsion motor 3 can be established. On the other hand, in the charging mode, the first set of terminals 4 is temporarily disconnected from the second set of terminals 6, such that a charging voltage supplied from the charging connector to the electrical connectors 9 of the connector interface 8 and further to the first set of terminals 4 is not supplied to the electrical propulsion motor 3 or associated electrical converter.

The switching mechanism thus provides a temporary electrical connection between the first set of terminals 4 and the second set of terminals 6 in the driving mode, while ensuring safe and reliable disconnection of the electrical propulsion motor 3 from the charging connector in the charging mode. In other words, electrical charging power from the charging connector is safely prevented from reaching the electrical propulsion motor 3.

As schematically illustrated in the example embodiment of FIG. 1, the switching mechanism may include foldable electrical connectors 9 for selectively setting the connector unit 1 in the driving mode or the charging mode. In particular, in the charging mode the electrical connectors 9 may be pivotally adjusted to a charging position in which they protrude towards the charging connector, and in the driving mode the electrical connectors 9 may be pivotally adjusted to a driving position in which they provide electrical contact between the first and second set of terminals 4, 6. In FIG. 1, the electrical connectors 9 are located in an intermediate position between charging position and driving position.

Furthermore, in certain example embodiments, as for example showed in FIG. 1, the electrical connectors 9 of the connector interface 8 may be accessible for being connected to the corresponding connector interface of a charging connector in the charging mode, and the electrical connectors 9 of the connector interface 8 may be non-accessible for the corresponding connector interface of a charging connector in the driving mode. In other words, in the driving mode the electrical connectors 9 may be folded down to be non-accessible. This has the advantage of reducing the risk of unintentional and potentially hazardous contact with the electrical connectors 9 by a user or service personnel.

Figure 2:
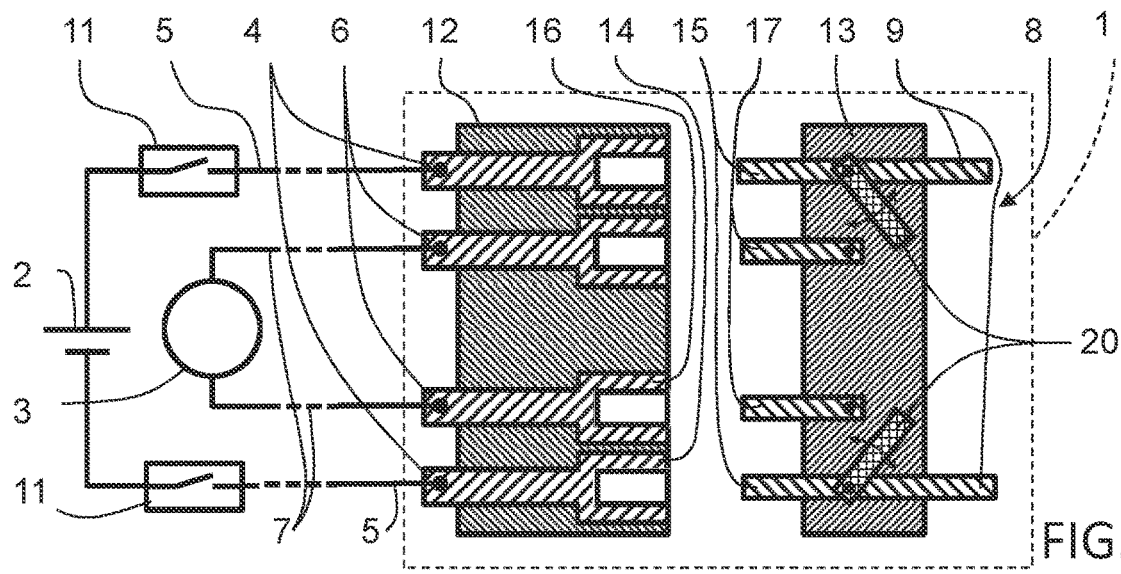
FIG. 2 shows a second example embodiment of a two-part connector unit.

Alternatively, as schematically illustrated in FIG. 2, the electrical connectors 9 of the connector interface are accessible for being connected to the corresponding connector interface of a charging connector in both the driving mode and charging mode, while still enabling a temporary electrical connection between the first set of terminals 4 and the second set of terminals 6.

Consequently, in the example embodiment of FIG. 2, the electrical connectors 9 as such are not folded to provide the temporary electrical connection between the first set of terminals 4 and the second set of terminals 6, but another dedicated switching part 20 of the connector unit 1 enables this task. An advantage of this embodiment is that the electrical connectors 9 may be more rigid because they do not have to be folded for enabling the temporary electrical connection between the first set of terminals 4 and the second set of terminals 6. A further advantage is that the dedicated switching part 20 may be made relatively small, such as for example a small mechanical switching part 20 or an electronic switching part 20 in form of a transistor switch or the like.

In FIG. 2, the switching parts 20 are located in an intermediate position between charging position and driving position.

Moreover, the switching mechanism may further be arranged for selectively setting the connector unit 1 in a locking mode, in which the first set of terminals 4 is disconnected from the second set of terminals 6, and in which the electrical connectors 9 of the connector interface 8 are non-accessible for the corresponding connector interface of a charging connector. Such a locking mode may for example be provided when setting the switching parts 20 in the intermediate position between charging position and driving position, as shown in FIG. 2.

The risk of unintentional and potentially hazardous contact with the electrical connectors 9 by a user or service personnel may be reduced by using a cover of some type for covering the otherwise accessible electrical contactors 9.

Figure 3:
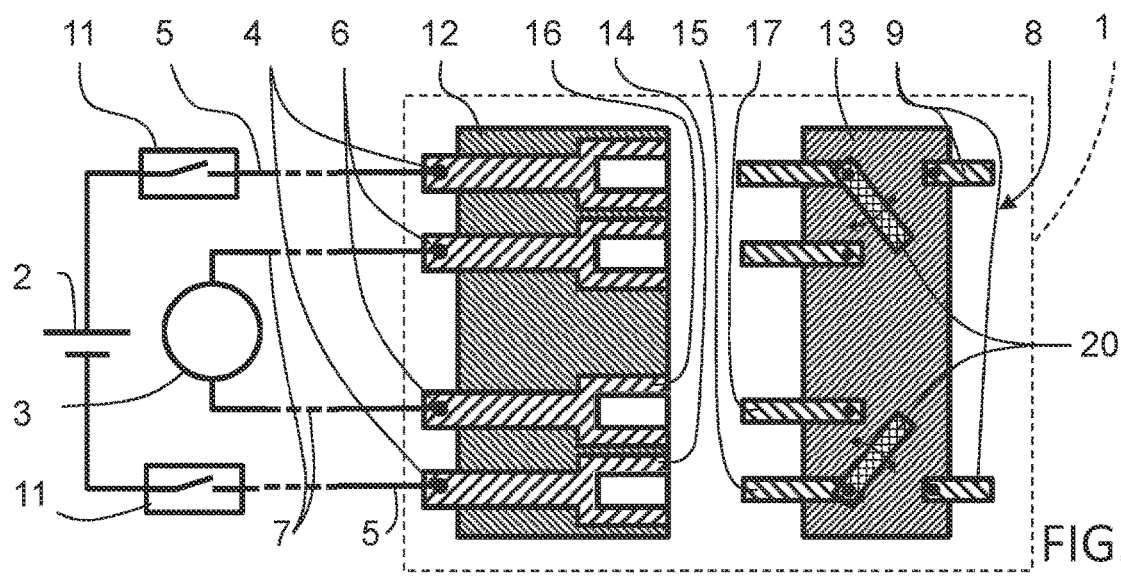
FIG. 3 shows a third example embodiment of a two-part connector unit.

Still a further example embodiment of the connector unit 1 is schematically shown in FIG. 3, in which the electrical connectors 9 of the connector interface 8 are connected with the first set of terminals 4 in the charging mode and disconnected from the first set of terminals 4 in the driving mode. This example embodiment has the benefits of the embodiment of FIG. 2, while still reducing the risk of unintentional and potentially hazardous contact with the electrical connectors 9 by a user or service personnel, because the electrical connectors 9 are simply disconnected from the first and second set of terminals 4, 6 in the driving mode.

The switching mechanism may for example be configured to be manually adjustable between the driving mode and the charging mode by a user of the vehicle. The user may then for example manually adjusting the switching mechanism to the charging mode before connecting the connector interface 8 of the connector unit 1 with the corresponding connector interface of a charging connector, and subsequently manually adjusting the switching mechanism back to the driving mode after having disconnected the connector interface 8 of the connector unit 1 from the corresponding connector interface of a charging connector. Manual adjustment of the switching mechanism may for example be accomplished by means of a manually operable lever, button, or similar type of actuators.

Alternatively, the switching mechanism may be configured to be remotely adjustable between the driving mode and the charging mode by a user of the vehicle, for example via a control device located in the cockpit of the vehicle, or via a wireless mobile device such as a smartphone.

Still more alternatively, the switching mechanism may be automatically actuated between the driving mode and charging mode, for example upon opening a cover, which normally covers the connector interface 8, or upon interaction between the charging connector and the connector unit 1, or the like.

Figure 4:
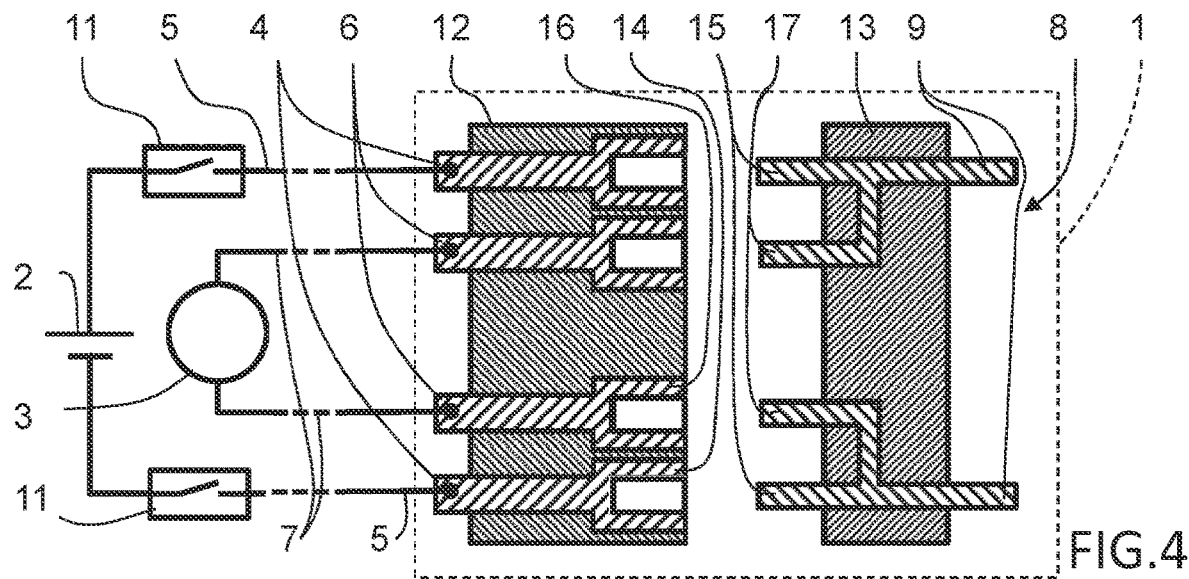
FIG. 4 shows a fourth example embodiment of a two-part connector unit.

FIG. 4 schematically shows still a further example embodiment of the disclosure, in which the first set of corresponding intermediate electrical connectors 15 is permanently connected with the second set of corresponding intermediate electrical connectors 17, and the electrical connectors 9 of the connector interface 8 are permanently connected with the first set of corresponding intermediate electrical connectors 15.

This type of connector unit 1 thus does not have any switching mechanism for selectively setting the connector unit 1 in a driving mode or a charging mode. Instead, when the first and second parts 12, 13 are connected, the first set of terminals 4 is permanently connected with the second set of terminals 6.

Moreover, when the first and second parts 12, 13 are connected, any charging voltage supplied from the charging connector to the electrical connectors 9 of the connector interface 8 and further to the first set of terminals 4 is permanently supplied to both the electrical propulsion motor 3 or associated electrical converter, and the high-voltage energy storage 2 or associated electrical converter.

This embodiment of the connector unit 1 has less moveable internal parts and may be more cost-efficiently manufactured, as well as providing a more reliable performance. For avoiding that charging current from a charging connector is supplied to the electrical motor 3 an electrical converter of the electric motor may be function as a circuit breaker in the charging mode.

Similarly, for reducing the risk of unintentional and potentially hazardous contact with the electrical connectors 9 by a user or service personnel a cover of some type for covering the otherwise accessible electrical contactors 9 may be used.

Figure 5:
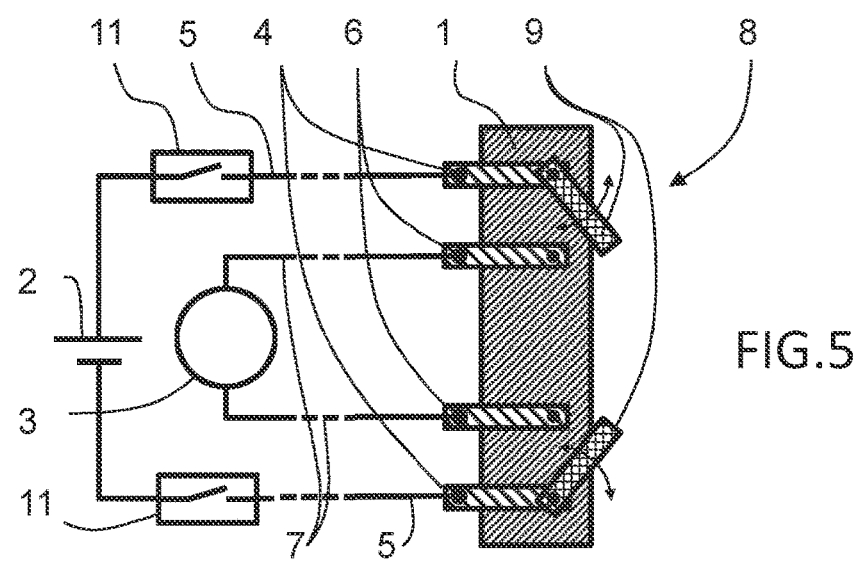
FIG. 5 shows a first example embodiment of a one-part connector unit.

FIG. 5 schematically shows a further alternative embodiment of the connector unit 1, which has essentially the same structure, functionality and optional design variations as described above with reference to FIG. 1, but which differs in that the connector unit 1 of FIG. 5 comprises a single housing. In other words, both the first and second set of terminals 4, 6, as well as the electrical connectors 9 and the connector interface 8, are all permanently located within the same single housing.

As a result, the connector unit 1 of FIG. 5 does not provide the same type of protection against vehicle theft or safe disconnection of the high-voltage energy storage 2 during service and repair work on the vehicle as the connector unit 1 according to FIG. 1. However, the one-part connector unit 1 according to the example embodiment of FIG. 5 has other advantageous aspects, such as simplified design and manufacturing of the connector unit 1.

Figure 6:
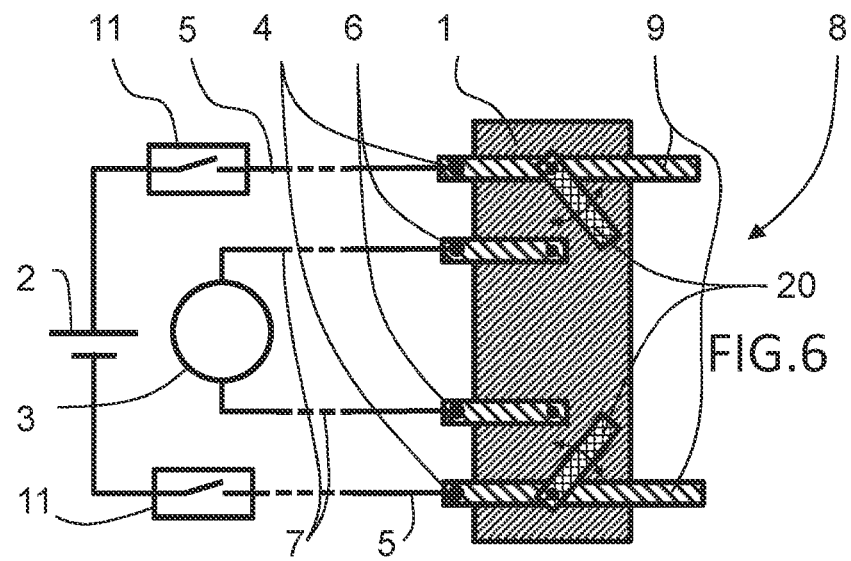
FIG. 6 shows a second example embodiment of a one-part connector unit.
Figure 7:
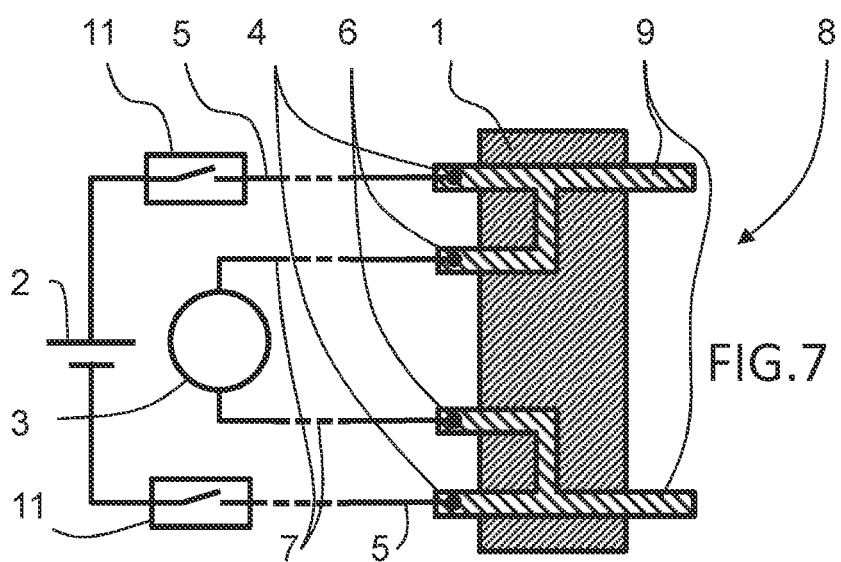
FIG. 7 shows a third example embodiment of a one-part connector unit.

Similarly, FIG. 6 schematically shows a further alternative embodiment of the connector unit 1, which has essentially the same structure, functionality and optional design variations as described above with reference to FIG. 2, but which differs in that the connector unit 1 of FIG. 7 comprises a single housing, and FIG. 7 schematically shows a further alternative embodiment of the connector unit 1, which has essentially the same structure, functionality and optional design variations as described above with reference to FIG. 4, but which differs in that the connector unit 1 of FIG. 7 comprises a single housing.

The connector unit 1 and electrical system for a plug-in electrical vehicle will now be further described with reference to FIG. 8, which schematically shows an example embodiment of a more complete electrical system illustrating also an external stationary charger 21.

The electrical system for the plug-in electrical vehicle comprises a high-voltage energy storage 2 having a single external electrical connection, an electrical propulsion motor 3, and a connector unit 1 including a first set of terminals 4, a second set of terminals 6 and a connector interface 8. The first set of terminals 4 are connected with the single high-voltage external electrical connection of the high-voltage energy storage 2. The second set of terminals 6 are connected with the electrical propulsion motor 3. The connector unit 1 is configured to provide temporary electrical connection between the first set of terminals 4 and the second set of terminals 6, and the connector interface 8 has electrical connectors 9 being configured for temporarily receiving a corresponding connector interface 25 of the charging connector 26 during charging of the high-voltage energy storage 2.

The connector unit 1 has essentially the same structure, functionality and optional design variations as described above with reference to FIG. 1.

A high-voltage energy storage electrical converter 22 for AC/DC or DC/DC conversion and/or for controlling charging and/or power output of the high-voltage energy storage 2 may be provided along the electrical cables or conductors 5 connecting the first set of terminals 4 with the high-voltage energy storage 2.

Alternatively, said electrical converter 22 may be omitted if an external stationary charger 21 comprises an electrical converter 29 for converting the supplied electrical energy from an external energy source 28 to a desired electrical charging power. The same applies for the embodiments of FIGS. 9-11 described below.

Furthermore, a mechanically or electrically operated switch 11 for enabling activation/deactivation of the electrical system 23 for the plug-in electrical vehicle is also provided along the electrical cables or conductors 5 connecting the first set of terminals 4 with the high-voltage energy storage 2.

An electrical converter 24 is also located along the electrical cables 7 connecting the second set of terminals 6 with the electrical propulsion motor 3 of the plug-in electrical vehicle. The electrical converter 24 may for example be configured for controlling the output speed and torque of the electrical propulsion motor 3.

Figure 8:
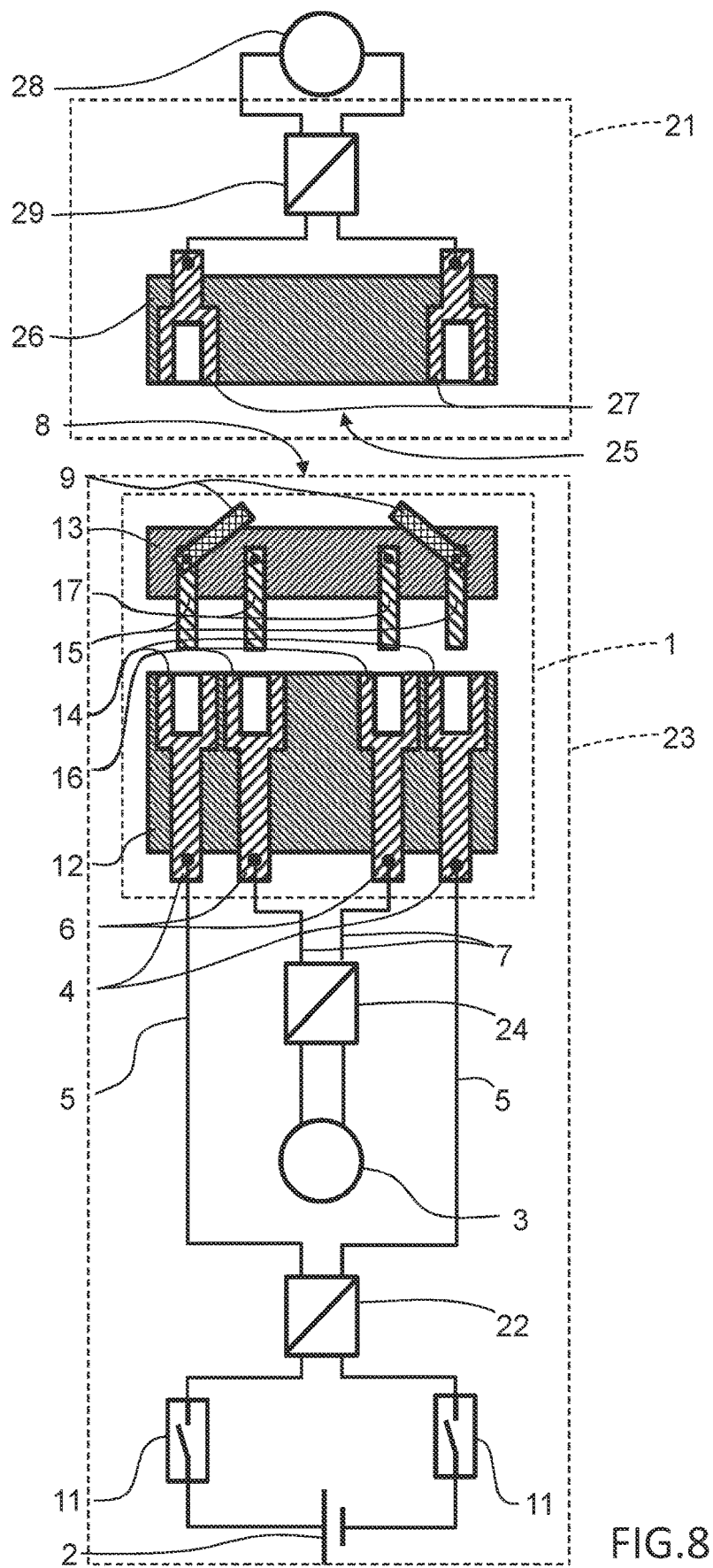
FIG. 8 shows a first example embodiment of an electrical system.

In the example embodiment of FIG. 8, the corresponding connector interface 25 of the charging connector 26 comprises two corresponding electrical connectors 27. The corresponding electrical connectors 27 are illustrated as female connectors. However, similarly as the electrical connectors 9 of the connector unit 1, the corresponding electrical connectors 9 may alternative be designed as male connectors, or mixed male and female connectors, or any other type of connectors. This applies all example embodiments of the disclosure.

Moreover, even if all example embodiments of the disclosure shows two electrical connectors 9 and two corresponding electrical connectors 27, which for example may represent a DC charger having a DC negative pin and DC positive pin, or single phase AC charger with a single phase pin and neutral pin, the connector unit 1 and electrical system according to the disclosure may alternatively be provided with three, four, five, six, seven, eight or more electrical connectors, depending on the type of electrical system and number of signaling or communication pins.

The connector unit 1 according to the disclosure may for example be adapted for use in system compatible with any of the various available charging connector design standards, such as for example SAE J1772 (Type 1 connector), IEC 62196 (Type 2 connector), Guobiao standard GB/T 20234.2-2015, CHAdeMO standard, Combined Charging System, Tesla Supercharger standard, etc.

The external stationary charger 21 is typically connected to an external electrical energy source 28, such as the electrical grid.

The external stationary charger 21 may, depending on the type and voltage level of the supplied electrical energy, further comprise an electrical converter 29 for converting the supplied electrical energy from the external energy source 28 to a desired electrical charging power. The electrical converter 29 may for example include AC/AC transformer, AC/DC conversion and/or DC/DC conversion, or the like.

Alternatively, said electrical converter 29 may be omitted if the electrical system 23 comprises an electrical converter 22 for AC/DC or DC/DC conversion and/or for controlling charging power of the high-voltage energy storage 2. The same applies for the embodiment of FIG. 10 described below.

Figure 9:
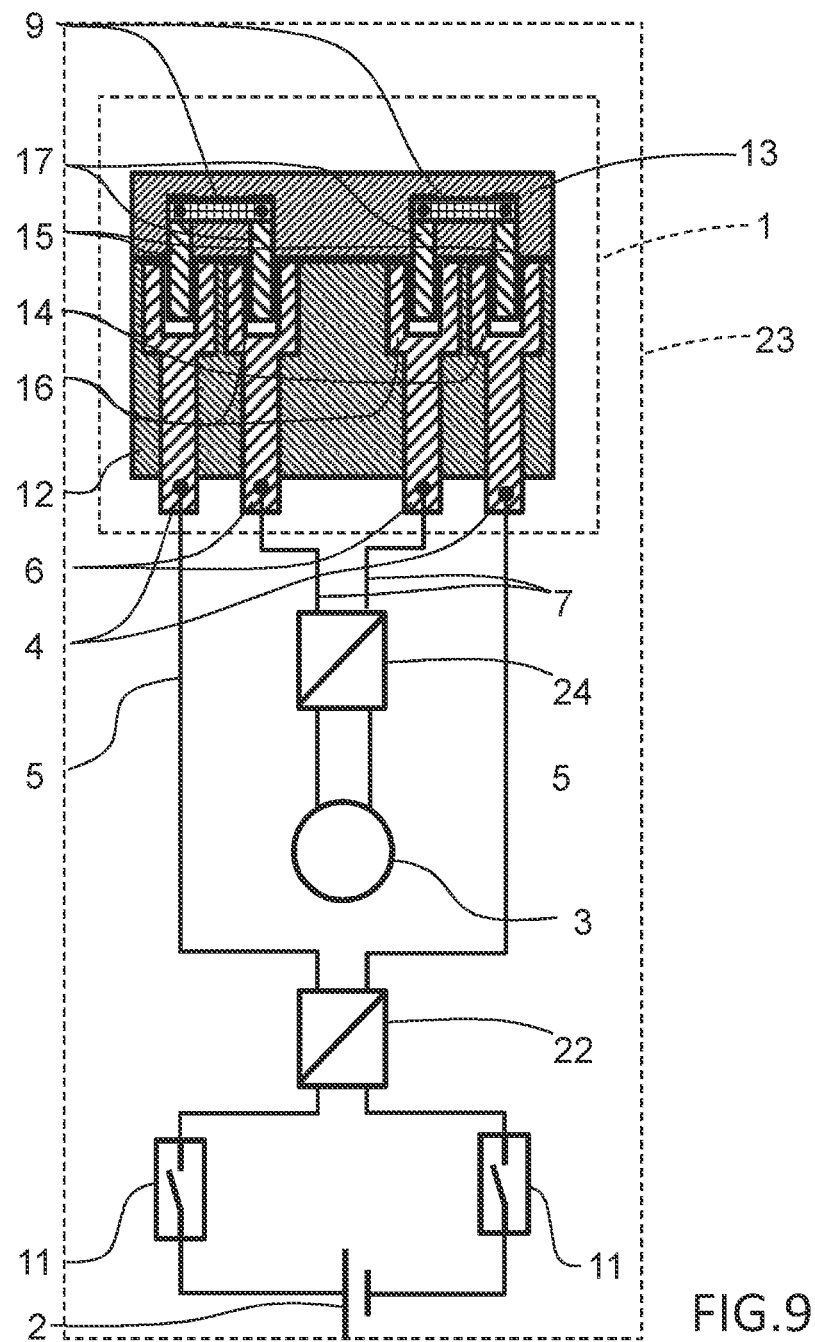
FIG. 9 shows the connector unit set in a driving mode.

FIG. 8 shows an overview of an example embodiment of some parts and components of the electrical system according to the disclosure. For further illustration of the functionality and advantages of the connector unit 1 and electrical system according to the disclosure, FIG. 9 shows the connector unit 1 and electrical system arranged in a driving mode.

Here, the first and second parts 12, 13 of the connector unit 1 are attached to each other by means of at least the first and second set of intermediate electrical connectors 14, 16 being connected with the first and second set of corresponding intermediate electrical connectors 15, 17.

Furthermore, the foldable electrical connectors 9 of the switching mechanism are folded down to the driving position, in which they provide electrical contact between the first and second set of terminals 4, 6. Thereby, in the driving mode, electrical energy may be supplied from the high-voltage energy storage 2 to the traction motor 3 via the connector unit 1.

Figure 10:
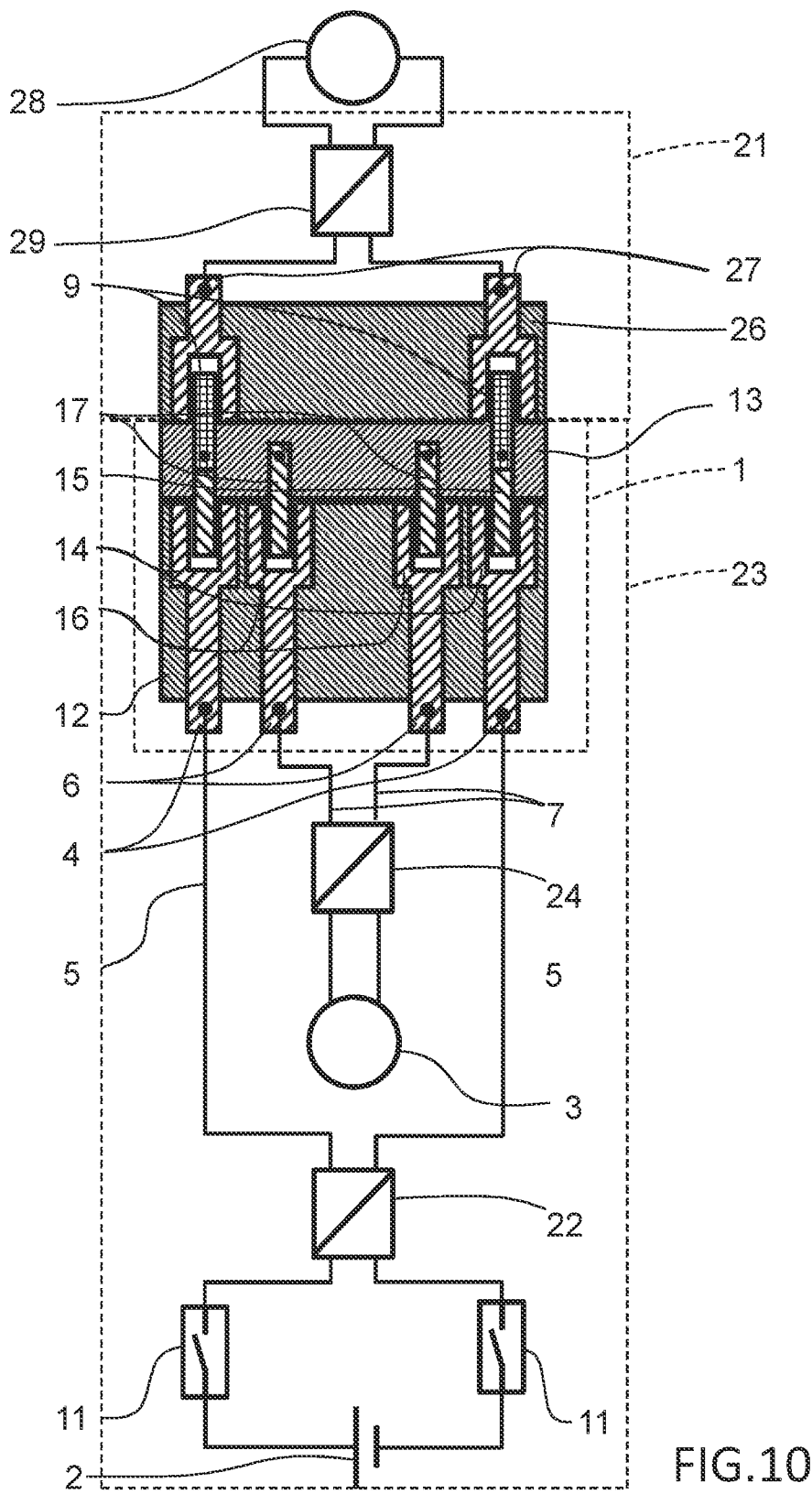
FIG. 10 shows the connector unit set in a charging mode.

For further describing the connector unit 1 and electrical system of the disclosure, FIG. 10 shows the connector unit 1 and electrical system arranged in the charging mode.

As before, the first and second parts 12, 13 of the connector unit 1 are attached to each other by means of at least the first and second set of intermediate electrical connectors 14, 16 being connected with the first and second set of corresponding intermediate electrical connectors 15, 17.

However, the foldable electrical connectors 9 of the switching mechanism are not folded down. Instead, the electrical connectors 9 are pivotally adjusted to a charging position in which they protrude towards and being connected with the corresponding electrical connectors 27 of the charging connector 26. Thereby, in the charging mode, electrical energy may be supplied from the external energy source 28 to the high-voltage energy storage 2 via the connector unit 1.

Moreover, since the electrical connectors 9 of the connector interface 8 are non-accessible arranged for a user, the risk for unintentional and potentially hazardous contact with the electrical connectors 9 by a user or service personnel is reduced.

Figure 11:
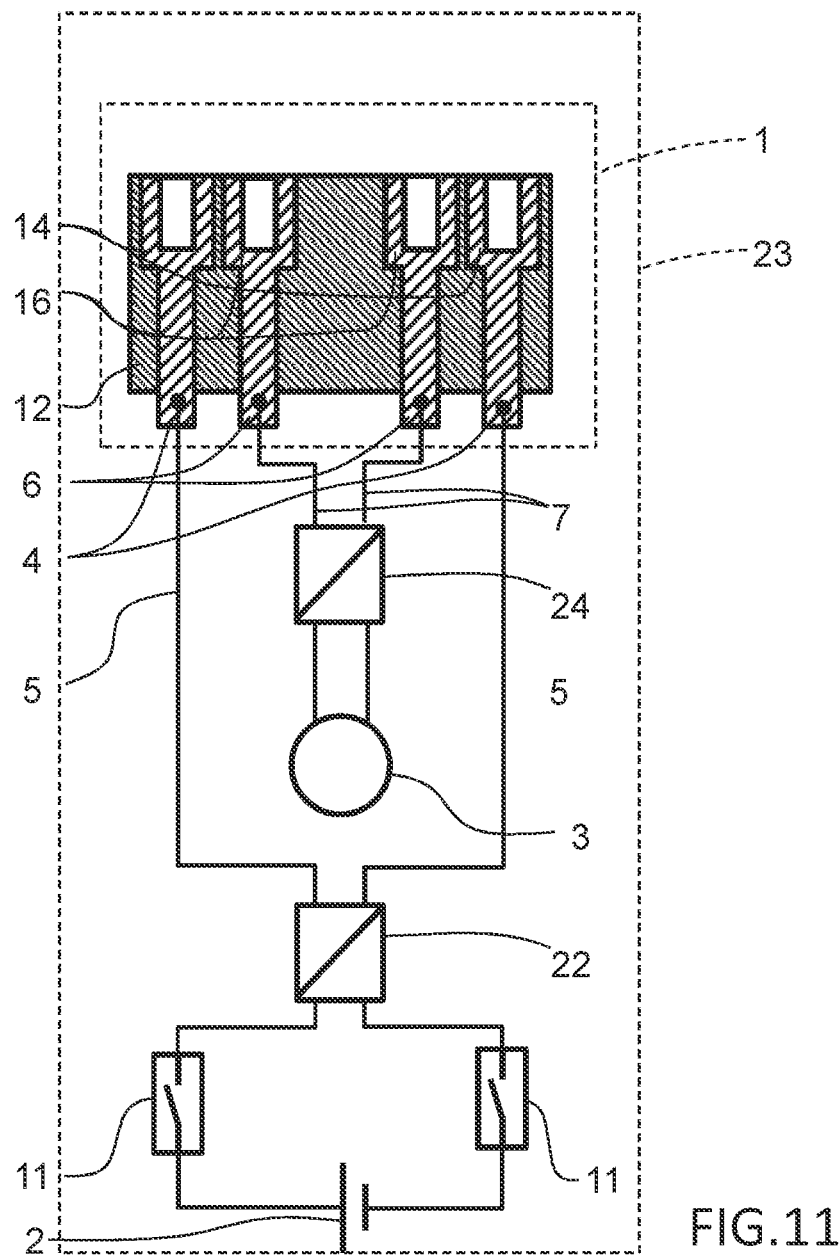
FIG. 11 shows a two-part connector unit with the second part removed.

For further describing the connector unit 1 and electrical system of the disclosure, FIG. 11 shows the connector unit 1 and electrical system arranged in an anti-theft or safe state, i.e. a state in which the second part 13 of the connector unit 1 has been removed. For example, the user may remove the second part 13 upon leaving the vehicle for anti-theft purpose, because without the second part 13 there is no possibility to drive the vehicle because the supply of electrical energy from the high-voltage energy storage 2 to the traction motor 3 is prevented. According to another example, service personnel may remove the second part 13 upon servicing the vehicle for safety reasons for reducing the risk for electrical shock.

Figure 12:
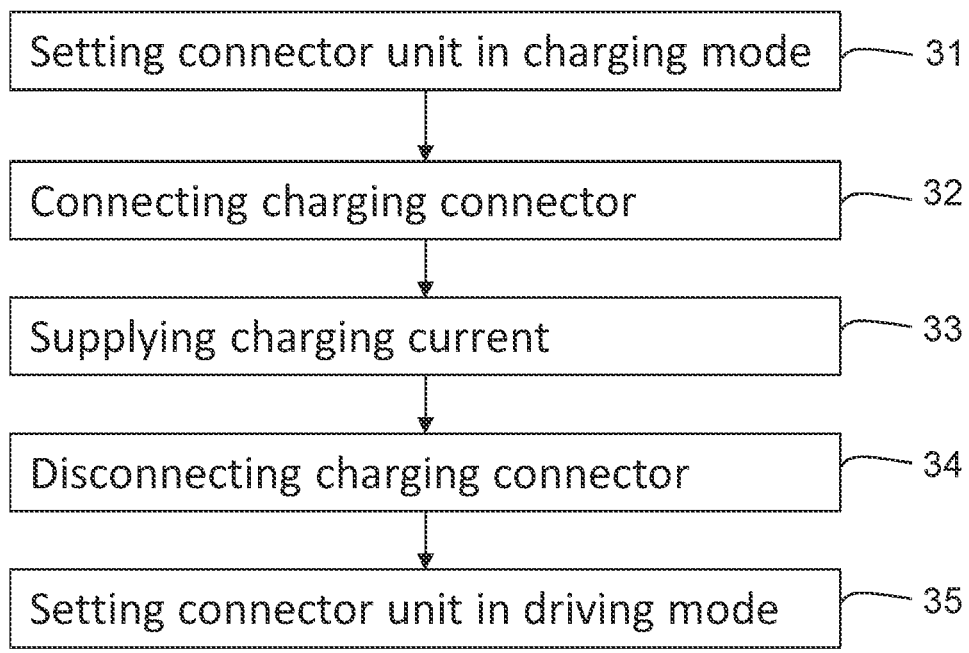

The disclosure further relates to a method for charging a high-voltage energy storage of a plug-in electrical vehicle. This method will be described with reference to FIG. 12, which shows the main steps of the method. Further steps may be added before, after and/or in-between these steps for further defining the method.

At start of the charging method it is assumed that the connector unit is set in the driving mode. The method comprises a first step 31 of adjusting a switching mechanism for setting a connector unit 1 in a charging mode, in which a first set of terminals 4 is temporarily disconnected from a second set of terminals 6. Since the first set of terminals 4 is connected with a high-voltage energy storage 2 and the second set of terminals 6 is connected with an electrical propulsion motor 3 of the plug-in electrical vehicle, setting the connector unit 1 in the charging mode results in disconnection of the high-voltage energy storage 2 and electrical propulsion motor 3.

The method further comprises a second step 32 of connecting a charging connector 26 of an external stationary charger 21 to a connector interface 8 of the connector unit 1.

Subsequently, the method comprises a third step 33 of supplying a charging current from the charging connector to the high-voltage energy storage via the connector unit 1.

Thereafter, the method comprises a fourth step 34 of disconnecting the charging connector from the connector interface of the connector unit, and final fifth step 35 of adjusting the switching mechanism for setting the connector unit 1 in the driving mode, in which the first set of terminals 4 is temporarily connected with the second set of terminals 6.

Figure 13:
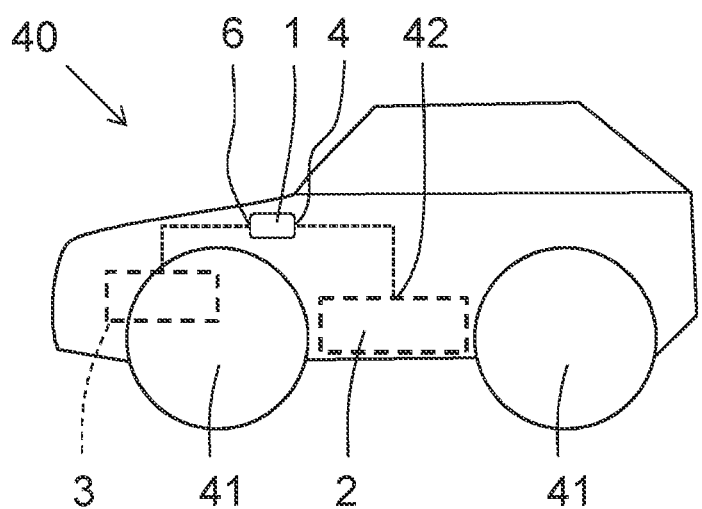
FIG. 13 shows a plug-in electrical vehicle comprising a connector unit.

FIG. 13 schematically illustrates an example plug-in electrical vehicle 40 comprising a connector unit 1 according to the disclosure. The plug-in electrical vehicle 40 comprise at least one electrical propulsion motor 3 having an output shaft drivingly connected with at least one of the wheels 41 of the vehicle 40, a high-voltage energy storage 2, such as a high-voltage battery pack, and a connector unit 1.

The connector unit may for example be easily accessible for a user from outside of the vehicle 40 for simplifying charging of the high-voltage energy storage 2. The connector unit 1 may thus for example be located at an exterior side of the vehicle 40, as shown in FIG. 13.

Charging of the high-voltage energy storage 2 is performed by connecting a charging connector 26 to the connector interface 8 of the connector unit 1.

The high-voltage energy storage 2 comprises a single external high-voltage electrical connection 42, which is connected with the first set of terminals 4 of the connector unit 1. The second set of terminals 6 of the connector unit 1 is connected with the electrical propulsion motor 3.

Consequently, a permanent or temporary electrical connection between the first set of terminals 4 and the second set of terminals 6 enables charging of the high-voltage energy storage 2 via the connector unit 1 in the charging mode, and routing of electrical energy from the high-voltage energy storage 2 to the electrical propulsion motor 3 in the driving mode.

Although the disclosure has been described in relation to specific combinations of components, it should be readily appreciated that the components may be combined in other configurations as well which is clear for the skilled person when studying the present application. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

The use of the word "a" or "an" in the specification may mean "one," but it is also consistent with the meaning of "one or more" or "at least one." The use of the term "or" in the claims is used to mean "and/or" unless explicitly indicated to refer to alternatives only.

The terms "comprise", "comprises", "comprising", "have", "has", "having", "include", "includes", "including" are open-ended linking verbs. As a result, a method or device that "comprises", "has" or "includes" for example one or more steps or elements, possesses those one or more steps or elements, but is not limited to possessing only those one or more elements.

What is claimed is:

1. Connector unit for a plug-in electrical vehicle, the connector unit comprising:
   a first set of terminals for connection with a high-voltage energy storage,
   a second set of terminals for connection with an electrical propulsion motor,
   a connector interface having electrical connectors and being configured for temporarily receiving a corresponding connector interface of a charging connector during charging of the high-voltage energy storage of the plug-in electrical vehicle, and a permanent or temporary electrical connection between the first set of terminals and the second set of terminals, wherein the connector unit comprises a first part and second part that are detachably mountable to each other, wherein the first part is configured for being permanently mounted on the vehicle and comprises the first and second set of terminals, wherein the second part comprises the connector interface with the electrical connectors, wherein the first part has a first set of intermediate electrical connectors that are connected with the first set of terminals and configured to establish an electrical connection with a first set of corresponding intermediate electrical connectors of the second part upon attachment of the first part with the second part, wherein the first part has a second set of intermediate electrical connectors that are connected with the second set of terminals and configured to establish an electrical connection with a second set of corresponding intermediate electrical connectors of the second part upon attachment of the first part with the second part, and wherein an adjustable or permanent connection between the first set of terminals and the second set of terminals, in an attached state of the first part with the second part, is located in the second part.

2. Connector unit according to claim 1, further comprising:

a switching mechanism for selectively setting the connector unit in a driving mode or a charging mode, wherein the first set of terminals is temporarily connected with the second set of terminals in the driving mode, such that a closed circuit between the high-voltage energy storage and the electrical propulsion motor can be established, wherein the first set of terminals is temporarily disconnected from the second set of terminals in the charging mode, such that a charging voltage supplied from the charging connector to the electrical connectors of the connector interface and further to the first set of terminals is not supplied to the electrical propulsion motor or associated electrical converter.

3. Connector unit according to claim 2, wherein the electrical connectors of the connector interface are connected with the first set of terminals in the charging mode and disconnected with the first set of terminals in the driving mode.

4. Connector unit according to claim 2, wherein the electrical connectors of the connector interface are accessible for being connected to the corresponding connector interface of a charging connector in the charging mode, and wherein the electrical connectors of the connector interface are non-accessible for the corresponding connector interface of a charging connector in the driving mode.

5. Connector unit according to claim 4, wherein the electrical connectors of the connector interface are configured for being folded down to be non-accessible for the corresponding connector interface of a charging connector in the driving mode.

6. Connector unit according to claim 2, wherein the electrical connectors of the connector interface are accessible for being connected to the corresponding connector interface of a charging connector in both the driving mode and charging mode.

7. Connector unit according to claim 2, wherein the switching mechanism further is arranged for selectively setting the connector unit in a locking mode, in which the first set of terminals is disconnected with the second set of terminals, and in which the electrical connectors of the connector interface are non-accessible for the corresponding connector interface of a charging connector.

8. Connector unit according to claim 2, wherein the switching mechanism is configured to be manually adjustable between the driving mode and the charging mode by a user of the vehicle.

9. Connector unit according to claim 8, wherein the switching mechanism is configured to be manually adjusted to the charging mode before connecting the connector interface with the corresponding connector interface.

10. Connector unit according to claim 2, wherein the switching mechanism is configured to be remotely adjustable between the driving mode and the charging mode by a user of the vehicle.

11. Connector unit according to claim 2, wherein the switching mechanism includes foldable electrical connectors for selectively setting the connector unit in the driving mode or the charging mode, wherein in the charging mode the electrical connectors are configured for being pivotally adjusted to a charging position in which the electrical connectors protrude towards the charging connector for enabling supply of electrical energy from an external energy source to the high-voltage energy storage via the connector unit, and wherein in the driving mode the electrical connectors are configured for being pivotally adjusted to a driving position in which the electrical connectors provide electrical contact between the first and second set of terminals for enabling supply of electrical energy from the high-voltage energy storage to the traction motor via the connector unit.

12. Connector unit according to claim 1, wherein the first set of terminals is permanently connected with the second set of terminals, and wherein the electrical connectors of the connector interface are permanently connected with the first set of terminals.

13. Connector unit according to claim 1, wherein the first set of corresponding intermediate electrical connectors is permanently connected with the second set of corresponding intermediate electrical connectors, and wherein the electrical connectors of the connector interface are permanently connected with the first set of corresponding intermediate electrical connectors.

14. Connector unit according to claim 1, wherein the electrical connectors of the connector interface are male connectors, female connectors, or mixed male and female connectors.

15. Connector unit according to claim 1, wherein the first and second set of intermediate electrical connectors are male connectors or female connectors or mixed male and female connectors.

16. Electrical system for a plug-in electrical vehicle, the electrical system comprises:

a high-voltage energy storage having a single external high-voltage electrical connection, an electrical propulsion motor, a connector unit including a first set of terminals, a second set of terminals and a connector interface, wherein the first set of terminals is connected with the single external high-voltage electrical connection of the high-voltage energy storage, wherein the second set of terminals is connected with the electrical propulsion motor, wherein the connector unit is configured to provide permanent or temporary electrical connection between the first set of terminals and the second set of terminals, wherein the connector interface has electrical connectors being configured for temporarily receiving a corresponding connector interface of a charging connector during charging of the high-voltage energy storage, wherein the connector unit comprises a first part and second part that are detachably mounted to each other, wherein the first part is permanently mounted on the vehicle and comprises the first and second set of terminals, wherein the second part comprises the connector interface with the electrical connectors, wherein the first part has a first set of intermediate electrical connectors that are connected with the first set of terminals and configured to establish an electrical connection with a first set of corresponding intermediate electrical connectors of the second part upon attachment of the first part with the second part, wherein the first part has a second set of intermediate electrical connectors that are connected with the second set of terminals and configured to establish an electrical connection with a second set of corresponding intermediate electrical connectors of the second part upon attachment of the first part with the second part, and wherein an adjustable or permanent connection between the first set of terminals and the second set of terminals is located in the second part.

17. Method for charging a high-voltage energy storage of a plug-in electrical vehicle, the method comprising:

adjusting a switching mechanism for setting a connector unit in a charging mode, in which a first set of terminals is temporarily disconnected from a second set of terminals, wherein the first set of terminals is connected with a high-voltage energy storage, wherein the second set of terminals is connected with an electrical propulsion motor of the plug-in electrical vehicle, wherein the connector unit comprises a first part and second part that are detachably mounted to each other, wherein the first part is permanently mounted on the vehicle and comprises the first and second set of terminals, wherein the second part comprises the connector interface with the electrical connectors, wherein the first part has a first set of intermediate electrical connectors that are connected with the first set of terminals and configured to establish an electrical connection with a first set of corresponding intermediate electrical connectors of the second part upon attachment of the first part with the second part, wherein the first part has a second set of intermediate electrical connectors that are connected with the second set of terminals and configured to establish an electrical connection with a second set of corresponding intermediate electrical connectors of the second part upon attachment of the first part with the second part, and wherein an adjustable or permanent connection between the first set of terminals and the second set of terminals is located in the second part, connecting a charging connector of an external stationary charger to a connector interface of the connector unit, supplying a charging current from the charging connector to the high-voltage energy storage via the connector unit, disconnecting the charging connector from the connector interface of the connector unit, and adjusting the switching mechanism for setting the connector unit in a driving mode, in which the first set of terminals is temporarily connected with the second set of terminals.

* * * * *